US008271799B2

(12) United States Patent
Wang

(10) Patent No.: US 8,271,799 B2
(45) Date of Patent: Sep. 18, 2012

(54) SYSTEM AND METHOD FOR GENERATING A DISGUISED PASSWORD BASED ON A REAL PASSWORD

(75) Inventor: Cho-Hao Wang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 344 days.

(21) Appl. No.: 12/625,045

(22) Filed: Nov. 24, 2009

(65) Prior Publication Data

US 2010/0318807 A1    Dec. 16, 2010

(51) Int. Cl.
*G06F 21/00* (2006.01)
(52) U.S. Cl. .............. 713/184; 713/193; 726/7; 726/18; 726/30; 380/42; 380/252
(58) Field of Classification Search .................. 713/184, 713/193; 726/18, 30; 380/42, 252
See application file for complete search history.

(56) References Cited

U.S. PATENT DOCUMENTS

| 7,904,729 B2* | 3/2011 | Little et al. ..................... 713/183 |
| 2002/0191786 A1* | 12/2002 | Marroquin ...................... 380/42 |
| 2003/0041251 A1* | 2/2003 | Kumhyr ........................ 713/184 |
| 2004/0160419 A1* | 8/2004 | Padgitt ........................... 345/173 |
| 2005/0187956 A1* | 8/2005 | Sylvester et al. .............. 707/101 |
| 2007/0156516 A1* | 7/2007 | Moissinac et al. .............. 705/14 |
| 2007/0250920 A1* | 10/2007 | Lindsay ............................. 726/7 |
| 2007/0261112 A1* | 11/2007 | Todd et al. ...................... 726/11 |
| 2008/0301462 A1* | 12/2008 | Dayan et al. ................... 713/184 |
| 2009/0044284 A1* | 2/2009 | Govindaraju .................... 726/30 |
| 2009/0070351 A1* | 3/2009 | Klug et al. ..................... 707/100 |
| 2009/0260077 A1* | 10/2009 | Zhu et al. ........................ 726/19 |

FOREIGN PATENT DOCUMENTS

| CN | 1952855 A | 4/2007 |
| CN | 101425896 A | 5/2009 |

* cited by examiner

*Primary Examiner* — Philip Chea
*Assistant Examiner* — Dorianne Alvarado David
(74) *Attorney, Agent, or Firm* — Altis Law Group, Inc.

(57) ABSTRACT

A system and method for generating a disguised password are provided. The method presets a real password via an input device, selects one or more characters from the real password as a verification code. The method further generates an encryption code corresponding to the verification code according to an encryption algorithm, generates a character string based on the encryption code, and displays a verification box on a display screen to receive an input key from the input device. In addition, the method determines whether the input key matches the encryption code of the character string, and generates a disguised password by replacing the verification code with the encryption code in the real password if the input key matches the encryption code of the character string.

13 Claims, 3 Drawing Sheets

| Real password | Verification code | Encryption code | Disguised password |
|---|---|---|---|
| 123qwa | 3 | @ | 12@qwa |
| 123qwa | a | M | 123qwM |
| 123qwa | 3a | @M | 12@qwM |

FIG. 3

SYSTEM AND METHOD FOR GENERATING A DISGUISED PASSWORD BASED ON A REAL PASSWORD

BACKGROUND

1. Technical Field

Embodiments of the present disclosure relate generally to systems and methods for encrypting passwords, and more particularly to a system and method for generating a disguised password based on a real password.

2. Description of Related Art

Computers and networks are often protected by passwords. In order to gain access to a computing system or a network system, an authorized user must enter a password. The computing system or network system authenticates the password by comparing the password entered by the user with a preset password. If the entered password matches the preset password, the user is given access. If the entered password does not match the preset password, the user is denied access. However, the entered password may be presented or gained by an unauthorized person when the user enters the password. The unauthorized person can break into the computing system or the network system using the presented password, to steal and/or corrupt data, and damage websites.

Accordingly, there is a need for a system and method for overcoming the aforementioned problem.

BRIEF DESCRIPTION OF THE DRAWINGS

FIG. 3 is a schematic diagram illustrating an example for generating a disguised password based on a real password preset by a user.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
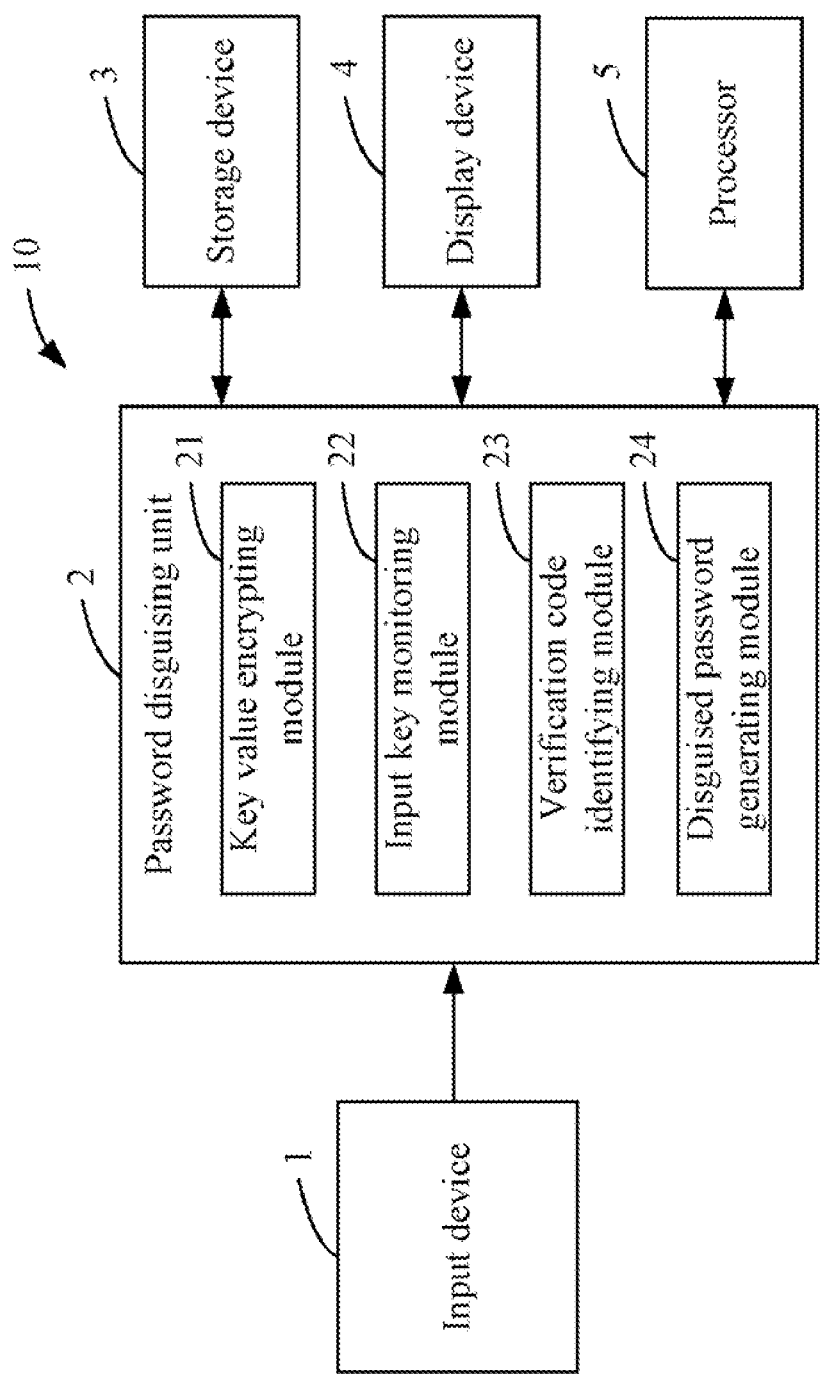
FIG. 1 is a schematic diagram of one embodiment of a system for generating a disguised password based on a real password.

FIG. 1 is a schematic diagram of one embodiment of a system 10 for generating a disguised password based on a real password preset by a user. In one embodiment, the system 10 may include a input device 1, a password disguising unit 2, a storage device 3, a display screen 4, and at least one processor 5. The input device 1 is operable to receive a real password that may be preset according to a user's requirement. The input device 1 may be a keyboard, a keypad, or a touch screen, for example. The password disguising unit 2 is operable to select one or more characters of the real password as a verification code, and generate an encryption code corresponding to the verification code according to an encryption algorithm. In one embodiment, the encryption algorithm may be a known encryption algorithm, such as a DAS algorithm or a MD5 algorithm, for example. The password disguising unit 2 is further operable to generate a disguised password according to the encryption code, and display the disguised password on the display screen 4.

In one example with respect to FIG. 3, if a user presets a character string "123qwa" as a real password, the password disguising unit 2 may select one or more characters from the real password as the verification code, such as "3," "a" and "3a." The verification code "3" may correspond to an encryption code "@," the verification code "a" may correspond to an encryption code "M," and the verification code "3a" may correspond to an encryption code "@M." When the real password "123qwa" is input from the input device 1, the password disguising unit 2 generates a disguised password that may be "12@qwa," "123qwM" or "12@qwM," and displays the disguised password to the display screen 4. After the user gets the disguised password by the password disguising unit 2, then the user can use the disguised password instead of the real password to enter a computing system or a network system.

The storage device 3 is operable to store a plurality of encryption codes, such as "@," "M," and "@M." In one embodiment, the storage device 3 may be an internal storage device, such as a random access memory (RAM) for temporary storage of information and/or a read only memory (ROM) for permanent storage of information. The storage device 3 may also be an external storage device, such as a hard disk, a storage card, or a data storage medium.

In one embodiment, the password disguising unit 2 may include a key value encrypting module 21, a input key monitoring module 22, a verification code identifying module 23, and a disguised password generating module 24. One or more computerized codes of the function modules 21-24 may be stored in the storage device 3, and executed by the at least one processor 5. In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. The modules described herein may be implemented as either software and/or hardware modules and may be stored in any type of computer-readable medium or other storage device.

The key value encrypting module 21 is operable to preset a real password via the input device 1, and select one or more characters from the real password as a verification code. In one example with respect to FIG. 3, if a user presets a character string "123qwa" as a real password, the key value encrypting module 21 may select the one or more characters, such as "3," "a" and "3a" for example, from the real password as the verification code. In addition, the key value encrypting module 21 is operable to set an encryption code corresponding to the verification code according to an encryption algorithm, and store the encryption code into the storage device 3. In one embodiment, the verification code "3" may correspond to an encryption code "@," the verification code "a" may correspond to an encryption code "M," and the verification code "3a" may correspond to an encryption code "@M."

The input key monitoring module 22 is operable to monitor and obtain the real password when the real password is inputted from the input device 1. In one embodiment, when a user enters a real password, such as "123qwa," for example, the input key monitoring module 22 obtains the real password from the input device 1.

The verification code identifying module 23 is operable to generate a character string based on the encryption code when the real password is input from the input device 1, and display a verification box on the display screen 4 to receive an input key from the input device 1. In order to authenticate the real password, the verification code identifying module 23 generates a character string, such as "8% kTMG," based on an encryption code (e.g., the encryption code "M"). The verification code identifying module 23 is further operable to determine whether the input key matches the encryption code of the character string. In one example, the encryption code "M" is included in the generated character string, therefore the input key "a" is needed to input from the verification box. When the input key does not match the encryption code of the character string, the verification code identifying module 23 continues to display a verification box on the display screen 4 to receive another input key from the input device 1.

The disguised password generating module 24 is operable to generate a disguised password by replacing the verification code with the encryption code in the real password if the input key matches the encryption code of the character string. Accordingly, the disguised password generating module 24 displays the disguised password on the display screen 4. In one embodiment, if the user enters the input key "a" from the verification box, the disguised password generating module 24 determines that the encryption code "M" corresponds to the verification code "a," and replaces the verification code "a" with the encryption code "M" in the real password "123qaw," so as to generate the disguised password "123qMw." Then the user can use the disguised password "123qMw" to access a computer system or a network system. If the disguised password "123qMw" is presented or gained by an unauthorized person, he/she can not enter the computer system using the disguised password, since the real password is "123qaw" instead of "123qMw."

Figure 2:
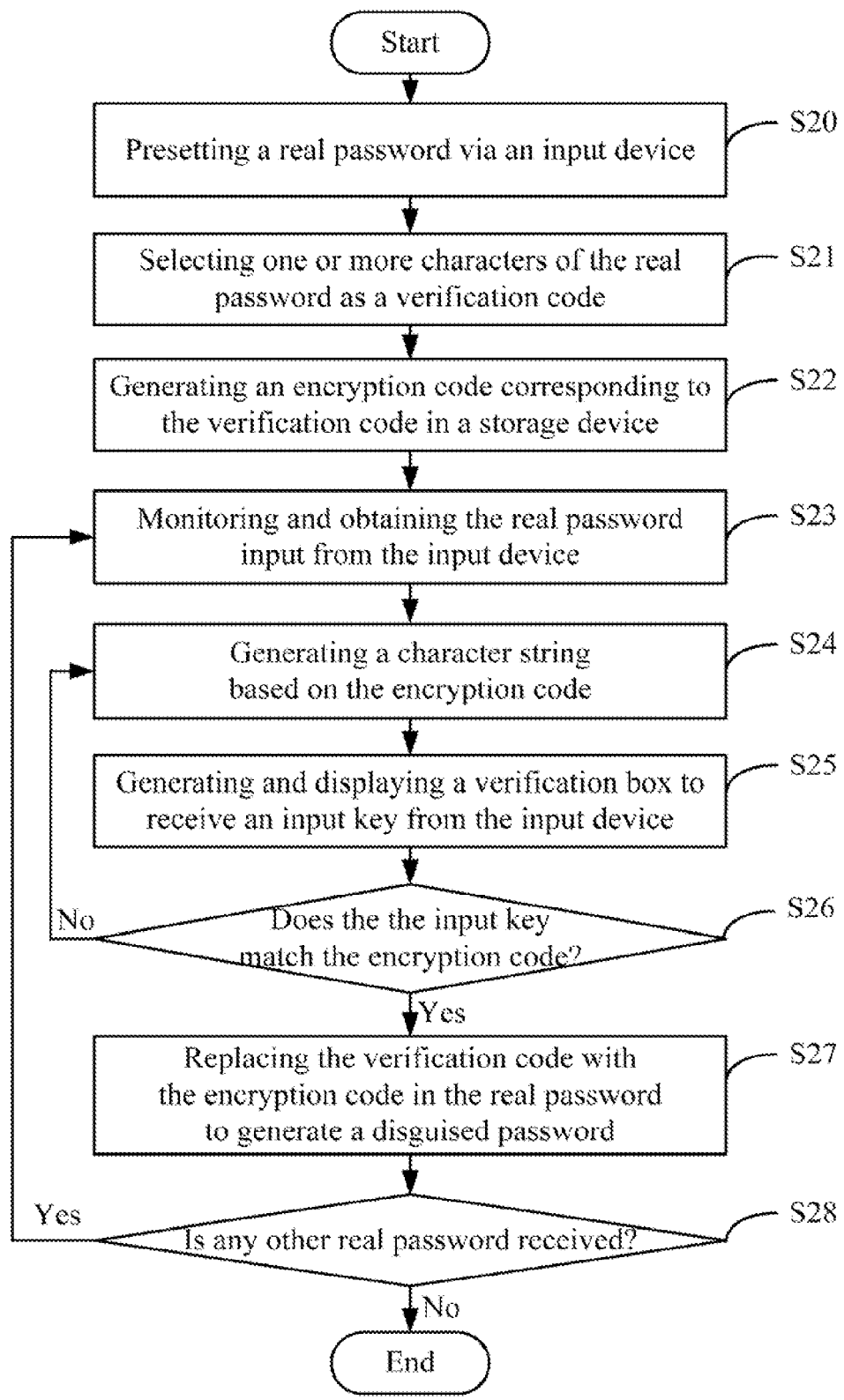
FIG. 2 is a flowchart of one embodiment of a method for generating a disguised password based on a real password by using the system of FIG. 1.

FIG. 2 is a flowchart of one embodiment of a method for generating a disguised password based on a real password by using the system 10 as described in FIG. 1. Depending on the embodiment, additional blocks may be added, others removed, and the ordering of the blocks may be changed.

In block S20, the key value encrypting module 21 presets a real password via the input device 1. The real password can be predefined according to a user's requirement, such as "123qwa," for example. In block S21, the key value encrypting module 21 selects one or more characters from the real password as a verification code. In one example with respect to FIG. 3, if a user presets a character string "123qwa" as a real password, the key value encrypting module 21 may select the one or more characters, such as "3," "a" and "3a" for example, from the real password as the verification code.

In block S22, the key value encrypting module 21 generates an encryption code corresponding to the verification code according to an encryption algorithm, and stores the encryption code into the storage device 3. As mentioned above, the encryption algorithm may be a common encryption algorithm, such as a DAS algorithm or a MD5 algorithm, for example. In one embodiment, the verification code "3" may correspond to an encryption code "@," the verification code "a" may correspond to an encryption code "M," and the verification code "3a" may correspond to an encryption code "@M."

In block S23, the input key monitoring module 22 monitors and obtains the real password when the real password is inputted from the input device 1. In one embodiment, when a user enters a real password, such as "123qwa," for example, the input key monitoring module 22 obtains the real password from the input device 1.

In block S24, the verification code identifying module 23 generates a character string based on the encryption code when the real password is input from the input device 1. In one embodiment, the verification code identifying module 23 generates a character string, such as "8% kTMG," based on an encryption code (e.g., the encryption code "M").

In block S25, the verification code identifying module 23 displays a verification box on the display screen 4 to receive an input key from the input device 1. In one example, the encryption code "M" is included in the generated character string, therefore the user needs to input the input key "a" from the verification box.

In block S26, the verification code identifying module 23 determines whether the input key matches the encryption code of the character string. If the input key does not match the encryption code of the character string, the verification code identifying module 23 continues to display a verification box on the display screen 4 to receive another input key from the input device 1.

Otherwise, if the input key matches the encryption code of the character string, in block S27, the disguised password generating module 24 generates a disguised password by replacing the verification code with the encryption code in the real password, and displays the disguised password on the display screen 4. In one embodiment, when the user inputs the input key "a" from the verification box, the disguised password generating module 24 determines that the encryption code "M" corresponds to the verification code "a," and replaces the verification code "a" with the encryption code "M" in the real password "123qaw" to generate the disguised password "123qMw." As such, the user can use the disguised password "123qMw" to access a computer system or a network system. If the disguised password "123qMw" is presented or gained by an unauthorized person, he/she can not enter the computer system using the disguised password, since the real password is "123qaw" instead of "123qMw."

In block S28, the input key monitoring module 22 determines whether any other real password is inputted from the input device 1. If any other real password is inputted from the input device 1, the flow returns to block S23 as described above. If no real password is inputted from the input device 1, the flow ends.

All of the processes described above may be embodied in, and fully automated via, functional code modules executed by one or more general purpose processors of computing devices. The functional code modules may be stored in any type of readable medium or other storage devices. Some or all of the methods may alternatively be embodied in specialized the computing devices.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for generating a disguised password, the system comprising:
   a password disguising unit stored in a storage device; and
   at least one computer processor that executes the password disguising unit, the password disguising unit comprising:
   a key value encrypting module that presets a real password received from an input device, selects one or more characters from the real password as a verification code, and generates an encryption code corresponding to the verification code according to an encryption algorithm;
   a verification code identifying module that generates a character string including the encryption code when the real password is input from the input device, displays a verification box on a display screen to receive an input key from the input device, and determines whether the input key matches the encryption code of the character string; and a disguised password generating module that generates a disguised password by replacing the verification code with the encryption code in the real password if the input key matches the encryption code of the character string, wherein the disguised password comprises unselected characters of the real password and the encryption code.

2. The system according to claim 1, further comprising an input key monitoring module that monitors and obtains the real password from the input device.

3. The system according to claim 1, wherein the key value encrypting module further stores the encryption code into the storage device.

4. The system according to claim 1, wherein the input key monitoring module determines whether any other real password is inputted from the input device.

5. The system according to claim 1, wherein the input device is a keyboard, a keypad, or a touch screen.

6. A method for generating a disguised password, the method comprising:
presetting a real password received from an input device;
selecting one or more characters from the real password as a verification code;
setting an encryption code corresponding to the verification code according to an encryption algorithm;
generating a character string including the encryption code when the real password is input from the input device;
displaying a verification box on a display screen to receive an input key from the input device;
determining whether the input key matches the encryption code of the character string; and
generating a disguised password by replacing the verification code with the encryption code in the real password if the input key matches the encryption code of the character string, wherein the disguised password comprises unselected characters of the real password and the encryption code.

7. The method according to claim 6, further comprising:
storing the encryption code into a storage device; and
displaying the disguised password on the display screen to an authorized user.

8. The method according to claim 6, further comprising:
determining whether any other real password is input from the input device; and
monitoring and obtaining the real password if any other real password is input from the input device.

9. The method according to claim 6, wherein the input device is a keyboard, a keypad, or a touch screen.

10. A non-transitory computer-readable storage medium having stored thereon instructions that, when executed by a processor of a computing device, cause the computing device to perform a method for generating a disguised password, the method comprising:
presetting a real password received from an input device;
selecting one or more characters from the real password as a verification code;
setting an encryption code corresponding to the verification code according to an encryption algorithm;
generating a character string including the encryption code;
displaying a verification box on a display screen to receive an input key from the input device;
determining whether the input key matches the encryption code of the character string; and
generating a disguised password by replacing the verification code with the encryption code in the real password if the input key matches the encryption code of the character string, wherein the disguised password comprises unselected characters of the real password and the encryption code.

11. The storage medium according to claim 10, wherein the method further comprises:
storing the encryption code into a storage device; and
displaying the disguised password on the display screen to an authorized user.

12. The storage medium according to claim 10, wherein the method further comprises:
determining whether any other real password is input from the input device; and
monitoring and obtaining the real password if any other real password is input from the input device.

13. The storage medium according to claim 10, wherein the input device is a keyboard, a keypad, or a touch screen.

* * * * *